INVENTOR.
ROGER E. PACKARD
LLOYD M. CHERRY

BY Christie, Parker & Hale
ATTORNEYS

DIGITAL COMPUTER HAVING AN ADDRESS CONTROLLER OPERATION

Filed March 25, 1966

3 Sheets-Sheet 2

INVENTOR
ROGER E. PACKARD
LLOYD M. CHERRY
BY
Christie, Parker & Hale
ATTORNEYS

United States Patent Office 3,400,380
Patented Sept. 3, 1968

3,400,380
DIGITAL COMPUTER HAVING AN ADDRESS CONTROLLER OPERATION

Roger E. Packard, Glendora, Calif., and Lloyd M. Cherry, Lake Park, Fla., assignors to Burroughs Corporation, Detroit, Mich., a corporation of Michigan Filed Mar. 25, 1966, Ser. No. 537,506
16 Claims. (Cl. 340—172.5)

Figure 1B:
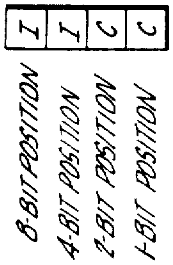

This invention relates to high speed digital computer systems and, more particularly, to such systems wherein the format of data operands is manifested by controller bits provided with each operand address and wherein translations between different formats are automatically effected under the control of these bits.

The operation of the an automatic digital computer in carrying out a program of instructions is generally split into two phases which normally alternate: the fetch phase and the execute phase. During the fetch phase of operation, the next instruction to be executed is selected from computer memory and transferred to one or more control registers, while during the execute phase of operation an operation code segment of the instruction is decoded and the particular operation specified by the instruction is executed. During the execution of many instructions, data operands are read from memory, designated manipulations are performed upon these operands by a data processor, and an operand resulting from these manipulations is written into memory.

Instructions requiring the performance of operations upon data stored in the memory will normally include operation code digits indicative of the particular operation to be performed, field length digits indicative of the length of one or more data operands on which the operation is to be performed, and address field digits indicative of the addresses in memory where the data operands are located.

Data operands may be manifested in a number of different binary formats. Thus, for example, a decimal number may conveniently be represented in binary coded decimal format. In this format four bits are utilized to manifest each decimal digit. These four-bit segments may be referred to as "digits" and in many systems each such "digit" stored in memory will be individually addressable. Data operands may thus be represented in "signed numeric" format wherein the first "digit" of a field manifests the sign of the operand while subsequent "digits" of the field manifest decimal digits of the operand. Decimal numbers may also be represented in "unsigned numeric" format wherein every "digit" of the field manifests a decimal digit and the sign of the data operand remains unspecified. Data operands which include not only decimal numbers but also alphabetic and other characters may advantageously be represented in an "alphanumeric" format. Each alphanumeric character may conveniently by manifested, for example, by eight bits. These eight-bit segments may be referred to as "characters" and may be thought of as equivalent to two four-bit "digits." Data operands may also be represented in numerous other binary formats in addition to the three exemplary formats just described.

In most prior art computer systems, each data handling component of the system ordinarily required that all of the data handled by it be in the same format. Additionally, the various data handling components of these systems often operated most efficiently with data represented in different formats. Thus, for example, processor units within the system usually operated most efficiently with decimal data represented in "digit" (four-bit) format whereas most peripheral devices operated most efficiently with all data represented in "character" (eight-bit) format. Consequently, translations between these formats must constantly be performed in these systems. For example, data operands coming into such a computer system in "character" format would be compressed into "digit" format; operations would be performed upon such data and a result operand in "digit" format achieved; finally the result operand would be expanded into "character" format before being transmitted to an output device.

The present invention provides an arrangement whereby a computer system may flexibly utilize data in a combination of various formats. It allows data in "digit" format to be expanded to "character" format, or data in "character" format to be compressed to "digit" format, simultaneously with the execution of other operations such as transfer, compare, and arithmetic type operations.

Additionally, the present invention enables the format of data associated with each address field of an instruction to be identified by means of the address field itself and allows control circuitry associated with processor circuitry to be set up accordingly.

The present invention also eliminates the necessity of executing separate expand and compress operations for changing data from one format to another thereby achieving a significant saving in time.

Additionally, memory space is conserved by means of the present invention in that compressed data does not need to be expanded before it is actually needed in expanded form, and expand and compress instructions need not be stored in the program. Memory space is also saved in that a separate area of memory need not be reserved to store data in its alternate form.

Another advantage realized by the present invention is that data can be preserved in its original format.

Furthermore, by eliminating the need for putting specific expand and compress instructions into the program, the present invention achieves a significant saving in program time. By automatically making such translations it also removes this programming burden from the programmer.

In brief, the advantages of the present invention are realized by means of automatically recognizing the format of data associated with each address field selected from the computer memory during the fetch phase of operation and by means of automatically setting up control circuitry associated with the computer processor. Binary controller digits comprising a portion of each address field are utilized to manifest the particular format of data associated with that field. The control circuitry automatically translates the data from the format indicated by the controller digits to a particular format whenever the data is read from memory and transmitted to the processor. Similarly, the control circuitry automatically translates data from the particular format to the format indicated by the controller digits whenever data is transmitted from the processor and written into the memory. Thus, regardless of the format of any data while stored in memory, the processor always operates upon data represented in a single particular format.

Figure 1A:
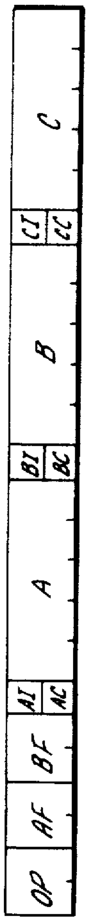
Figure 3:
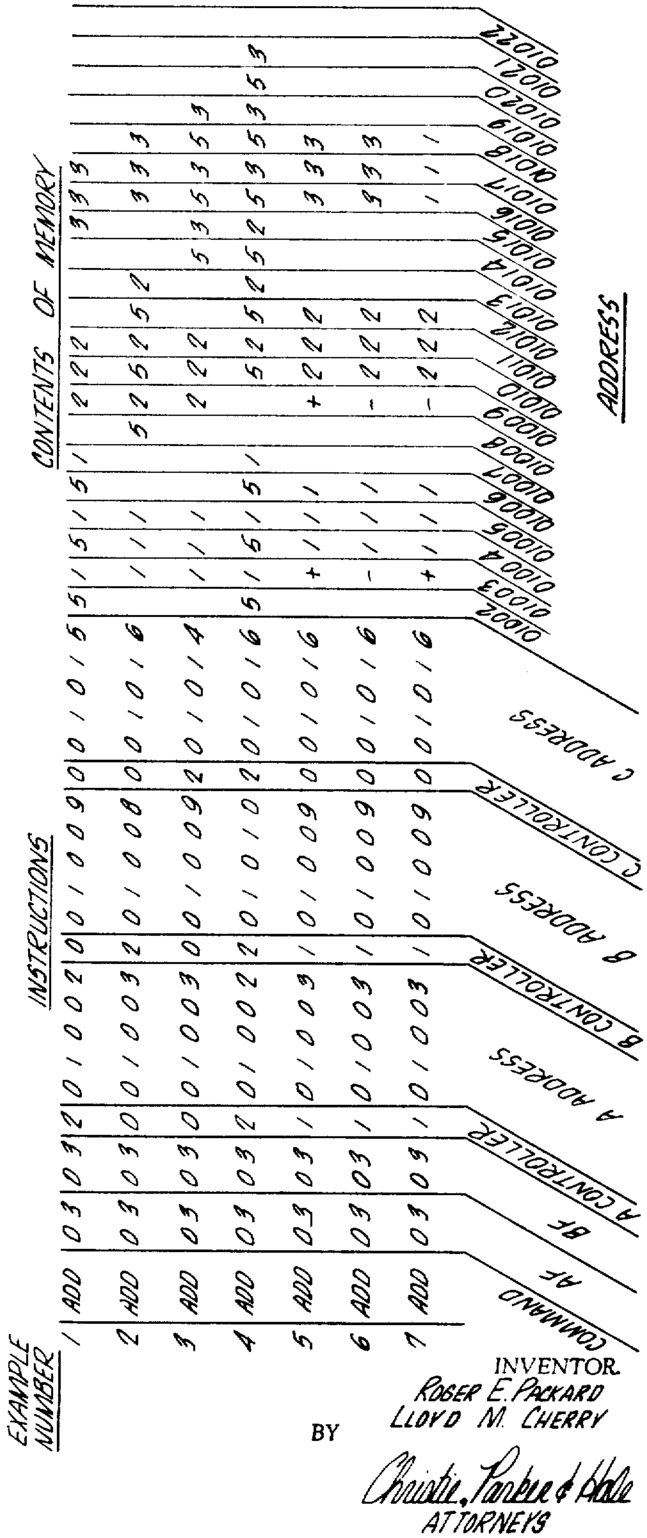
Figure 2B:
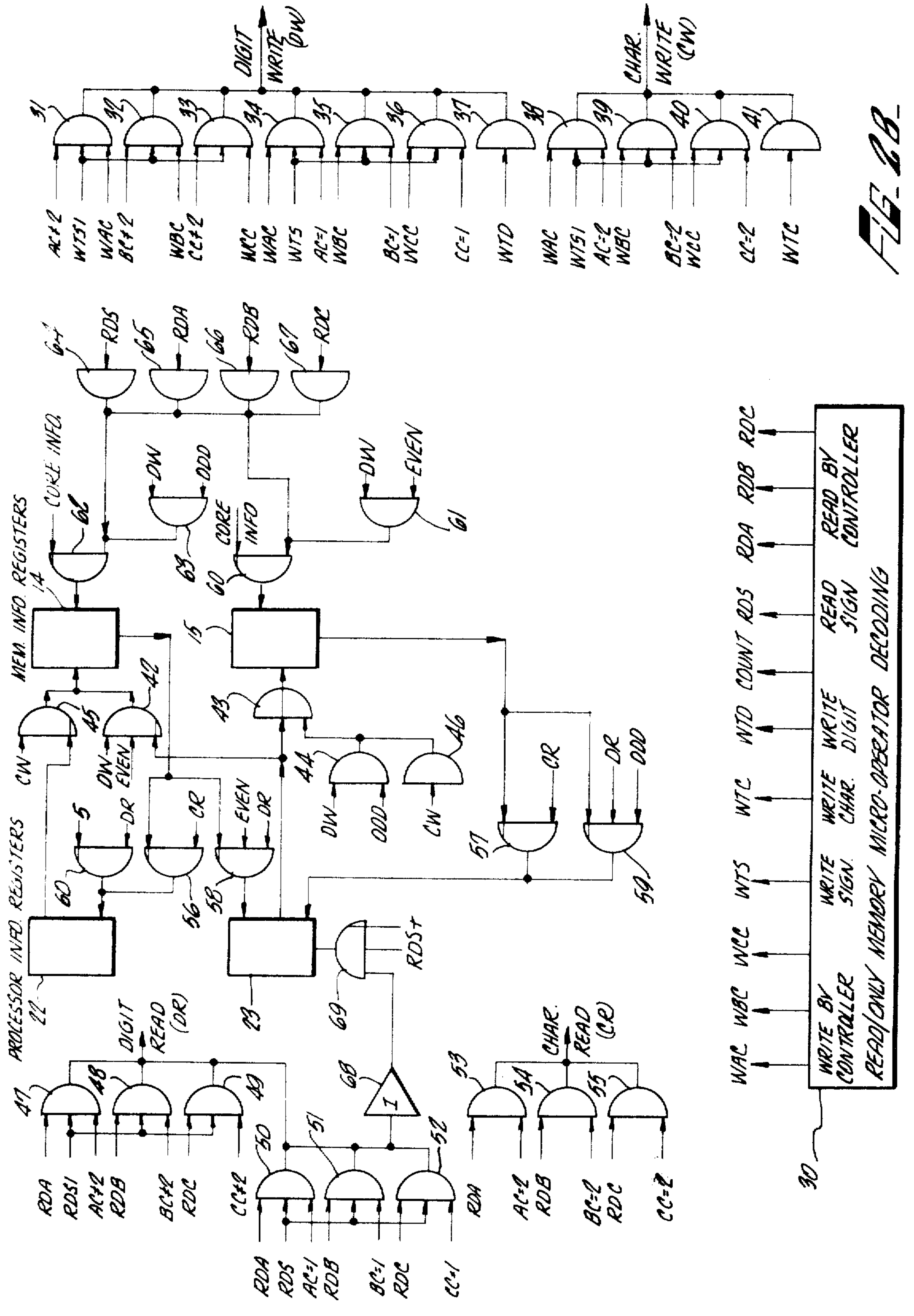
Figures 2A, 2C:
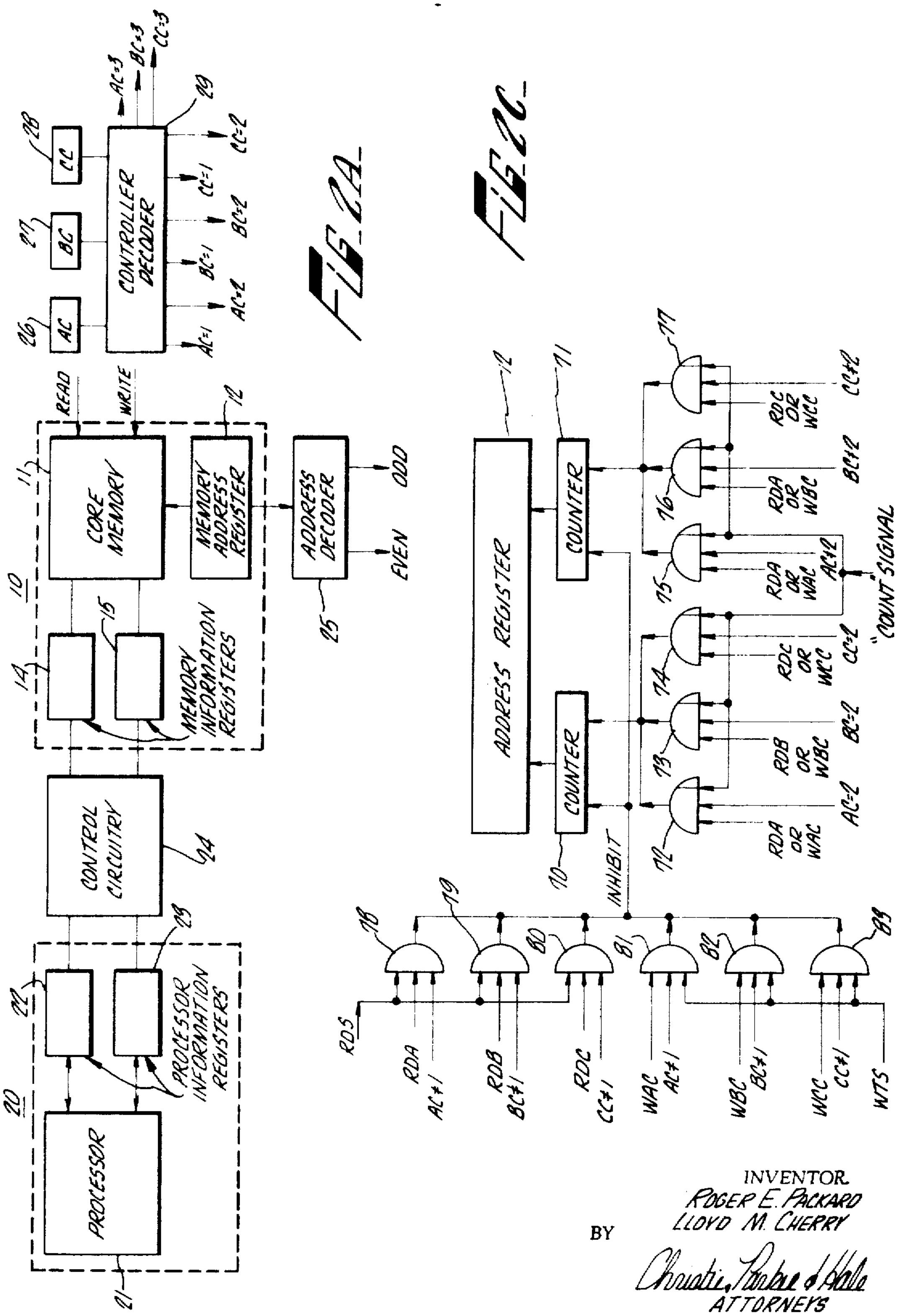

For a complete understanding of the invention, reference should be made to the accompanying drawing, in which:

FIGS. 1A and 1B depict the format of a typical instruction word which may be utilized in conjunction with the present invention;

FIGS. 2A, 2B, and 2C depict, partially in block diagram form, one embodiment of the present invention utilizing instruction words of the format depicted in FIG. 1; and FIG. 3 depicts, in tabular form, several illustrative operations of the embodiment depicted in FIGS. 2A, 2B, and 2C.

FIG. 1A depicts the format of a typical instruction word which may be utilized in conjunction with the present invention. It depicts an instruction word which consists of 24 binary coded decimal digits with each decimal digit comprising four binary bits. Each decimal digit is individually addressable in the embodiment of the present invention described herein, and the instruction is considered to be divided into four six-digit syllables. The first two digits of the first syllable denote a particular instruction and are referred to as operation code digits. The remaining four digit positions of the first syllable are used as variants. The first two digit positions of the variants are referred to as the AF variant digits and the remaining two digit positions are referred to as the BF variant digits. The second syllable consists of six decimal digits which make up an A address field. The third syllable consists of six digits which make up a B address field, and the fourth syllable consists of six digits which make up a C address field. The low order five digits of each address field represent an address within a core memory of the computer system. The remaining digit is designated the controller digit.

The controller digit includes four bits, two of which indicate whether indexing is to be performed and which index register is to be used. Such indexing operations are described, for example, in the copending application of William Buster and Roger Packard, Ser. No. 537,572, field March 25, 1966, and assigned to the assignee of the present application. The remaining two bits of the controller digit comprise address controller bits. The address controller bits may manifest four binary states which are herein designated 0, 1, 2, and 3. The address controller bits of each address field designate the format of data located at the address of memory associated with that field. Thus, for example, state 0 is used herein to indicate that data is in "unsigned numeric" format; state 1 is used herein to indicate that the data is in "signed numeric" format; and state 2 is used herein to indicate that the data is in "alphanumeric" format. State 3 is used to indicate that indirect addressing is to be performed. The means whereby indirect addressing is effected forms no part of the present invention.

A data field in "unsigned numeric" format is made up of a number of digits of numeric information, each of which, in the embodiment being described, comprises four bits. A data field in "signed numeric" format is also made up of a number of digits each of which comprises four bits, but the first digit of the field manifests a sign rather than a decimal digit. The length of such fields are indicated by the variant digits of the instruction shown in FIG. 1A. Thus, for example, if the controller associated with the A address field of the instruction shown in FIG. 1A manifests state 0, this would indicate that the data field associated with the A address field is of "unsigned numeric" format. The length of this particular data field would be indicated by the AF variant digits. Similarly, if the controller bits associated with the B address field manifest state 1, this would indicate that the data field associated with the B address field is in "signed numeric" format and the length of this field would be indicated by the BF variant digits. The four-bit digit stored in the core memory at the address designated by the A address field would be the first digit of a data field in "unsigned numeric" format. The succeeding digits of this field would be found in succeeding addresses of the core memory. The four-bit digit stored at the address designated by the B address field will manifest a sign rather than a decimal digit since this data field is in "signed numeric" format. Succeeding addresses will manifest the decimal digits of this signed numeric data field.

In the embodiment of the present invention being described, data fields in "alphanumeric" format require eight bits to manifest each alphanumeric character. The eight bits making up each alphanumeric character may be considered to comprise two four-bit digits. Thus, for example, if the C controller bits of the instruction of FIG. 1A manifest state 2, this indicates that the data field associated with the C address field is in "alphanumeric" format. In this case, the address in core memory manifested by the five address bits of the C address field will be the address at which the first digit of the first alphanumeric character is stored. The digit stored at the succeeding address will be the second digit of the first alphanumeric character. The length of a C address field will ordinarily be equal to the larger of the two values indicated by the AF and BF variant digits.

In the present invention complete flexibility with respect to the format of data fields specified by a single instruction is achieved. Thus, for example, if the instruction shown in FIG. 1A were assumed to be an "ADD" command, it would indicate that a data field in "unsigned numeric" format is to be added to a data field in "signed numeric" format, and that the resulting data field should be stored in "alphanumeric" format.

FIG. 1B depicts a controller digit of the instruction shown in FIG. 1A. It may be seen that the controller digit is made up of four bits and that the bits in the two-bit position and in the one-bit position comprise the controller bits. In the embodiment of the present invention being described these two controller bits manifest the format of the data field associated with the address field in which the controller bits are included. Each address field of an instruction is thereby enabled to designate a particular one of three possible formats which may be assumed by its associated data field.

FIG. 2A depicts in block diagram form an embodiment of the present invention. In FIG. 2A the numeral 10 indicates generally a memory unit which, for example, includes a core memory 11 which is addressed by the contents of memory address register 12. In the embodiment shown, two four-bit digits are transferred in and out of core memory 11 via a memory information register which comprises a first register 14 and a second register 15. The digit stored at an even valued memory address is transferred from memory 11 to register 14 while the digit stored at the next adjacent address is stored in register 15. Numeral 20 indicates generally a processing unit which, for example, includes processor 21 and a processor information register comprising a first register 22 and a second register 23. Control circuitry 24 is connected between the processor information registers and the memory information registers. An address decoder 25 decodes the memory addresses stored within register 12 and provides a signal indicative of whether the address stored in register 12 is even or odd.

During the fetch of an instruction such as that shown in FIG. 1A, the controller bits associated with each address field are stored in registers. Thus, in FIG. 2A registers 26, 27, and 28 store the A, B, and C controller bits, respectively. These controller bits are decoded by decoding circuitry 29 which provides signals indicative of the states manifested by the controller bits. At the conclusion of the fetch operation, each of the controller bits will be in state 0, 1, or 2, since all indirect addressing will have been performed during the fetch phase of operation.

In the embodiment of the present invention being described processor 21 operates as a character machine. All data operated upon by processor 21 is in "alphanumeric" format. Thus, register 22 will contain the first digit and register 23 the second digit of each character being transferred to or received from processor 21. If a data field being read from memory 11 and transferred to processor 21 is in "signed" numeric or "unsigned" numeric format, it is translated by controller circuitry 24 into "alphanumeric" format before being transferred to the processor information registers 22 and 23. If a data field being written into memory 11 from processor 21 is to be written into memory 11 in either "signed" numeric or "unsigned" numeric format, it will be translated by control circuitry 24 into the proper format before being transferred into registers 14 and 15. As a result, complete flexibility with respect to the format of data fields being handled by the system is achieved. It is thus possible to store data fields in memory 11 in any desired format since control circuitry 24 will provide any necessary translation from "unsigned numeric" or "signed numeric" to "alphanumeric" during a read operation and from "alphanumeric" to either "signed numeric" or "unsigned numeric" during a write operation.

If a data field being transferred to the processor is already in "alphanumeric" format, it is operated upon in this format. If it is in one of the "numeric" formats, it is automatically converted to an "alphanumeric" format representation on the same digit. The address controller bits indicate that the field being transferred to the processor is in one of the "numeric" formats and the control circuitry therefore automatically converts it to "alphanumeric" format. Conversely, the address controller bits are utilized to determine whether a data field being received from the processor should be stored in either "signed numeric" or "unsigned numeric" format and control ciruitry 24 then automatically converts the field to the proper format.

As stated previously, each address of memory 11 stores four bits. The four bits at each address may make up a complete "signed numeric" or "unsigned numeric" digit or half of an alphanumeric character. An alphanumeric character will be stored at two adjacent addresses. In the present embodiment, an alphanumeric character will be stored at an even address and the odd address following the even address. The term "digit" will be used herein to refer to four bits of information stored at a single address and the term "character" will be used herein to refer to eight bits of information stored at two adjacent addresses. Data in "alphanumeric" format will frequently be referred to as being in character form and data in either "signed" or "unsigned" numeric format will frequently be referred to as being in digit form. Whenever a data field being introduced to the processor is in digit form, the processor will automatically convert it to character form. This is established in the present embodiment simply by adding the numeric digit 5 in front of each of the digits being received. Thus, the alphanumeric character representation of the digit 4 is 54, the 5 being the first digit of the character and the 4 the second digit of the character. Similarly, the alphanumeric representation of 5 is 55 and of 6 is 56. The system simply adds a 5 in front of each digit in order to obtain the corresponding alphanumeric character. As a result, data fields reaching the processor are always in character form just as if the memory 11 stored all such data in character form. The processor then operates a character at a time on this data. When data is transferred from the processor 21 to memory 11, the processor always generates data in character form. When the controller indicates that data is to be stored in digit form, the control circuitry 24 simply throws away the digit 5 from the alphanumeric representation of the data leaving the same data in digit form. Thus, the control circuitry adds the digit 5 when going from digit form to character form, and throws it away when going from character form to digit form.

An additional concern is that of the arithmetic sign of particular data fields. Particular instructions need to know if there is a sign on data fields being processed. Thus, for example, if an instrumention which pays attention to sign, such as an arithmetic or transfer instruction, is causing data to be transferred from the memory to the processor, the first thing it must do is to read the sign of each data field being read out of the memory 11. A memory cycle is performed in order to read the first digit at the address of the beginning of the field. Data fields operated upon the processor will always have a sign associated therewith in the present embodiment. A data field transferred to processor 21 from memory 11 will be considered a positive field unless the field transferred from memory 11 was a "signed numeric" field of negative sign. In transferring data fields from processor 21 to memory 11 the sign associated with the field generated by the processor will be eliminated unless the field is to be written into memory 11 in signed numeric format.

FIG. 2B depicts in detail the means by which control circuitry 24 may accomplish the transfer of data fields between processor 21 and memory 11 under the control of the controller bits. FIG. 2B depicts the processor information registers 22 and 23, memory information registers 14 and 15, and gating circuitry comprising the control circuitry 24 shown in FIG. 2A. FIG. 2B also depicts a read-only memory 30. Output signals from memory 30 are indicative of micro-operations which are to be performed during the execution of an instruction. A micro-operation is an operation which may be performed during a single clock time during the performance of an instruction. Operation decoding circuitry and sequence count circuitry (not shown in FIG. 2B) are used to address the read-only memory 30 which thereby provides signals for stepping through the execution of an instruction. Such a read-only memory for the storage of micro-operations is disclosed, for example, in the copending application of Roger E. Packard, filed July 6, 1965, Ser. No. 469,386, and assigned to the assignee of the present application.

Typical write and read operations performed under the control of the circuitry shown in FIG. 2B will next be described. During a typical write operation data fields are written into core memory 11 from processor 21. In the embodiment being described, the micro operator signals provided from memory 30 which are of interest during a write operation are the following:

Signal WAC which indicates that a write operation is to be performed under the control of the A controller;
Signal WBC which indicates that a write operation is to be performed under the control of the B controller;
Signal WCC which indicates that a write operation is to be performed under the control of the C controller;
Signal WTS which is used in conjunction with signals WAC, WBC or WCC and which indicates that a sign is to be written;
Signal WTC which indicates that a character is to be written; and
Signal WTD which indicates that a digit is to be written.

The latter two signals WTC and WTD are used when the system knows the format of the data being processed because of a particular instruction being executed. Thus, for example, when addresses are being manipulated, it knows that the data is always digital. As another example, when an eight-digit result descriptor is being written, the WTC signal may be utilized. In other cases, however, the address controller bits must be utilized to determine whether a "digit write" or a "character write" is to be performed during a write operation. Thus, when the information being written into memory 11 is to be in "unsigned numeric" or "signed numeric" format, a "digit write" operation will be performed, while when the data field is to be written into memory 11 in "alphanumeric" format, a "character write" operation will be performed.

Gates 31 through 41 and the signals applied thereto determine whether a "digit write" or "character write" operation will be performed. Gates 31 through 37 and the signals applied thereto indicate seven conditions under which a "digit write" operation is performed. These seven conditions are as follows:

(1) A WAC signal, a NOT WTS signal, and an $AC\neq 2$ signal applied to gate 31;
(2) A NOT WTS signal, a $BC\neq 2$ signal, and a WBC signal applied to gate 32;

(3) A NOT WTS signal, a $CC\neq2$ signal, and a WCC signal applied to gate 33;
(4) A WAC signal, a WTS signal, and an $AC=1$ signal applied to gate 34;
(5) A WBC signal, a WTS signal, and a $BC=1$ signal applied to gate 35;
(6) A WCC signal, a WTS signal, a $CC=1$ signal applied to gate 36;
(7) A WTD signal applied to gate 37.

Each of these seven combinations of signals will produce, as shown in FIG. 2B, a "digit write" (DW) signal. In addition there are four conditions under which a "character write" (CW) operation will be performed. They are as follows:

(1) A WAC signal, a NOT WTS signal, and an $AC=2$ signal applied to gate 38;
(2) A WBC signal, a NOT WTS signal, and a $BC=2$ signal applied to gate 39;
(3) A WCC signal, a NOT WTS signal, and a $CC=2$ signal applied to gate 40;
(4) A WTC signal applied to gate 41.

Each of these four combinations of signals will produce a "character write" (CW) signal, as shown in FIG. 2B.

It may be seen that in the embodiment of the present invention depicted in FIG. 2B, there are no WTS signals utilized in conjunction with the "character write" gates 38 through 41. This results since in this particular embodiment alphanumeric characters are stored in memory 11 in unsigned form. The gating circuitry 31 through 41 provides either a digit write signal DW or a character write signal CW in response to the signals applied to these gates. The DW and CW signals are used by other gating circuitry to gate information from processor information registers 22 and 23 into the memory information registers 14 and 15. During each "digit write" operation a complete memory cycle comprising a read cycle and a write cycle is performed. During the read cycle, a digit is read from memory 11 and stored into one of the information registers 14 and 15 and a digit is transferred from the processor to the other one of the registers 14 and 15. During the write portion of the cycle, information stored in these registers 14 and 15 is written into memory 11. The memory address register 12 indicates the address being written into during a "digit write" operation and the address decoder 25, shown in FIG. 2A, determines whether the address being written into is even or odd and provides a signal indicating whether it is even or odd. The two digits written into the memory during the write portion of the memory cycle will always comprise an even digit and an odd digit. During a "digit write" operation, the signal from decoder 25 guides the digit being transferred from the processor information registers to the proper one of the information registers 14 and 15.

During a "digit write" operation wherein the digit is to be written into an even address, the following operations take place: The processor 21 transmits a character into the processor information registers 22 and 23. Since we are presently concerned with a "digit write" operation, the character stored in registers 22 and 23 will be an alphanumeric representation of a decimal digit. The alphanumeric character stored in registers 22 and 23 will therefore be made up of a 5 stored in register 22 and a decimal digit in register 23. Register 22 may be considered to be the most significant digit location and register 23 may be considered to be the least significant digit location for the two digits making up an alphanumeric character stored in the processor information registers. After the alphanumeric representation of the decimal digit has been stored in registers 22 and 23, an "Even" signal and a "digit write" signal will effect the transference of the decimal digit stored in register 23 to the memory information register 14. This is accomplished by the signals applied to gate 42 in FIG. 2B. The register 14 may be considered to be the most significant register and register 15 may be considered to be the least significant register of the memory information register. Thus, during a "digit write" operation wherein the digit is written into an even address, the digit stored in the least significant register 23 of the processor information registers is transferred to the most significant register 14 of the memory information registers. A digit from memory 11 is transferred into register 15 via gate 60 in response to an "Even" signal and a "digit write" signal applied to gate 61.

If, on the other hand, a "digit write" operation wherein the digit is to be written into an odd address is performed, the transfer will take place from the least significant register 23 of the processor information register to the least significant register 15 of the memory information registers. This transfer is effected via gate 43 as a result of digit write and odd signals applied to gate 44. A digit from memory 11 is during this operation transferred into register 14 via gate 62 in response to an "Odd" signal and a "digit write" signal applied to gate 63. If a "character write" operation is to be performed, information from both registers of the processor information registers are transferred to the memory information registers. The digit in the most significant register 22 is transferred to the most significant register 14 and the digit in the least significant register 23 is transferred to the least significant register 15. This transfer occurs as a result of the "character write" signal applied to gate 45 and the "character write" signal applied to gate 46.

After the transfer has occurred from one or both of the processor information registers to one or both of the memory registers a write operation, a subsequent write portion of the memory cycle transfers the contents of registers 14 and 15 into memory 11.

The read operations are essentially the reverse of the write operations just described. During read operations information is transferred from one or both of the memory information registers 14 and 15 to the processor information registers 22 and 23.

Additional signals provided by the read-only memory 30 which are of interest during operations are the following:

RDA which indicates that a read operation is to be performed under the control of the A controller bits;
RDB which indicates that a read operation is to be performed under the control of the B controller bits;
RDC which indicates that a read operation is to be performed under the control of the C controller bits; and
RDS which indicates that a sign is to be read.

In the embodiment shown in FIG. 2B, six combinations of signals indicate that a "digit read" operation is to be performed. Gates 47 through 52 and the signals applied thereto indicate six conditions under which a "digit read" operation is performed. The six sets of conditions under which the digit read signal is generated are the following:

(1) A RDA signal, a NOT RDS signal, and an $AC\neq2$ signal applied to gate 47;
(2) A RDB signal, a NOT RDS signal, and $BC\neq2$ signal applied to gate 48;
(3) A RRC signal, a NOT RDS signal, and a $CC\neq2$ signal applied to gate 49;
(4) A RDA signal, a RDS signal, and an $AC=1$ signal applied to gate 50;
(5) A RDB signal, a RDS signal, and a $BC=1$ signal applied to gate 51; and
(6) A RDC signal, a RDS signal, and a $CC=1$ signal applied to gate 52.

Each of these six combinations of signals will produce, as shown in FIG. 2B, a "digit read" (DR) signal. In addition there are three conditions under which a "character read" (CR) operation will be performed. They are as follows:

(1) A RDA signal and an $AC=2$ signal applied to gate 53;
(2) A RDB signal and a $BC=2$ signal applied to gate 54; and
(3) A RDC signal and a $CC=2$ signal applied to gate 55.

When an RDS signal, RDA signal, RDB signal or RDC signal is provided by memory 30, information from two adjacent addresses of memory 11 are transferred via gates 62 and 60 into registers 14 and 15 during the read portion of a memory cycle in response to the application of these signals to gates 64 through 67, respectively. If a "character read" is to be performed, both of these digits are subsequently transferred to the registers 22 and 23 of the processor information register. If a "digit read" operation is to be performed and the address being read is an even valued address, the digit stored in register 14 is transferred to register 26 and a 5 is stored in register 22. If the address being read is an odd valued address, the digit stored in register 15 is transferred to register 23 and a 5 is stored in register 22.

During a "character read" operation, the digit stored in register 14 is transferred to register 22 by reason of a "character read" signal applied to gate 56, and the digit stored in register 15 is transferred to register 23 by reason of a "character read" signal applied to gate 57. During a "digit read" operation when the address being read is even, the digit stored in register 14 is transferred to register 23 by reason of an "even" signal and a "digit read" signal being applied to gate 58, and during a "digit read" operation when the address being read is odd, the digit stored in register 15 is transferred to register 23 by reason of an "odd" signal and a "digit read" signal being applied to gate 59. During either of these digit read operations, a 5 is stored in register 22 by reason of a "digit read" signal being applied to gate 60.

During any read operation, the digits established in registers 22 and 23 comprise an alphanumeric character. The character established in processor information registers 22 and 23 is thus completely independent of the format of the character transferred from memory information registers 14 and 15.

Next the operations with respect to arithmetic sign will be discussed. If data fields stored in the memory are being read it is usually necessary to determine the sign, if any, of each field being read. At the commencement of the reading of each field the read-only memory 30 will provide an RDS signal along with an RDA, RDB or RDC signal. Since the only data fields stored in memory 11 having signs are those stored in "signal numeric" format, the "sign read" operation is a "digit read" operation, rather than a "character read" operation. If the appropriate controller bits are in state 1, indicating that "signed numeric" format data is being read, signals applied to gates 50, 51, or 52 will provide a "digit read" signal. The appropriate even or odd digit, depending upon the address being read, will then be transferred from the appropriate one of the registers 14 and 15 into register 23 via gates 58 or 59 in response to a DR signal and an "Even" or "Odd" signal. If, during a "read sign" operation, the appropriate address controller bits are in state 2 or state 0 indicating that the format of the data field being read is either "alphanumeric" or "unsigned numeric," there will be no "digit read" signal generated and there will be no transfer of a digit from either register 14 or 15 to register 23. At this time a "pulse" signal is automatically inserted into register 23 via signals applied to inverter 68 and gate 69. Thus, when the read-only memory 30 indicates that a "read sign" operation is to take place, whatever sign is manifested by a digit field in "signed numeric" format will be transferred to register 23. If, however, the format of the digit field being read is other than "signed numeric," a "plus" sign will automatically be inserted into register 23.

With respect to the writing of a sign, the read-only memory 30 provides a WTS signal whenever a writing of sign may be necessary. During the write operation, however, a sign is written into memory 11 only for data being stored in memory 11 in "signed numeric" format. The processor, on the other hand, operates on the basis that all fields are in signed alphanumeric form. During the writing of any data field, the first character that comes into the processor information registers 22 and 23 will always represent a sign. The sign will be transferred to memory information registers 14 and 15 only if the data field is to be stored in memory 11 in "signed numeric" format. It will otherwise be thrown away. Since a sign will be written into memory 11 only when the data field is to be stored in memory 11 in "signed numeric" format, it therefore will be transferred to memory information registers 14 and 15 only during a "digit write" operation. Since "signed numeric" format is indicated by the controllers being in state 1, gates 34, 35, and 36 produce a "digit write" signal during the presence of a WTS signal only when the appropriate controller bits are in state 1. Thus, when a sign character is in registers 22 and 23 during a write operation, the sign digit stored in register 23 will be transferred to one or the other of the registers 14 and 15 only when a "digit write" signal is provided by gates 34, 35, or 36. When such "digit write" signal does occur, the digit stored in register 23 will be transferred to register 14 if an even address is being written into or to register 15 if an odd address is being written into. In all other cases neither of the digits stored in registers 22 and 23 will be transferred to registers 14 or 15 when the registers 22 and 23 are storing a sign.

FIG. 2C depicts means whereby the address register 12 may advantageously be counted up by either "1" or "2" during the reading of a data field from the memory 11 or during the writing of a data field into memory 11, depending upon the format of the field. A first counter 70 serves to increase the value of the address stored in register 12 by "2" while counter 71 serves to increase the value of the address stored in register 12 by "1." Gating circuitry is provided to energize one or the other of these counters in response to a "count" signal generated by read-only memory 30. The "count" signal is generated by memory 30 during the reading or writing of data fields whenever a memory cycle has been completed. Thus, at the start of a subsequent memory cycle information will be written into or read from a succeeding address. Whenever data fields are being written into or read from memory 11 in "unsigned numeric" or "signed numeric" format, the operands will be written or read a digit at a time. Thus, after an information value has been written into or read from a particular address the next information value will be written into or read from the immediately succeeding address. Thus, in FIG. 2C whenever information is being written into or read from the memory in "unsigned numeric" or "signed numeric" format, the counter 71 will be energized by the count signals from read-only memory 30 and the register 12 will be increased by "1," in response to each count signal. When information is being written into or read from the memory in "alphanumeric" format, however, it is advantageous to read and write a character at a time. Since an alphanumeric character is equal to two digits, it is desirable during the read or write of fields in "alphanumeric" format to be able to count up register 12 by "2" in response to each count signal. In FIG. 2C this is accomplished by energizing counter 70 in response to "count" signals from memory 30 whenever information is being written into or read from memory 11 in "alphanumeric" format. The proper counter is energized in response to a "count" signal by the gating circuitry of FIG. 2C wherein gates 72, 73, and 74 enable a "count" signal to energize counter 70 whenever an RDA or WAC signal is present along with an $AC=2$ signal; whenever an RDB or WBC signal is present along with a $BC=2$ signal; or whenever an RDC or WCC signal is present along with a $CC=2$ signal. Similarly, gates 75, 76, and 77 enable a "count" signal from memory 30 to energize counter 71 whenever an RDA or WAC signal is present along with an $AC\neq2$ signal; whenever an RDB or WBC signal is present along with a $BC\neq2$ signal; or whenever an RDC or WCC signal is present along with a $CC\neq2$ signal. As a result of this gating circuitry a "count" signal will cause the address register to be increased by "1" whenever "unsigned numeric" or "signed numeric" format data is being written or read and will cause register 12 to be increased by "2" whenever "alphanumeric" format data is being written or read.

As stated hereinbefore, a "read sign" operation will cause information in memory information registers 14 and 15 to be transferred to processor information registers 22 and 23 only when "signed numeric" format data is being read. Similarly, during a "write sign" operation information contained in processor information registers 22 and 23 will be transferred to memory information registers 14 and 15 only when the information is to be stored in "signed numeric" format. Therefore, it is necessary that when information is being written into memory 11 in a format other than "signed numeric" or is being read from memory 11 in a format other than "signed numeric," that the address register not be counted up at the end of the "read sign" or "write sign" operation. This inhibiting of the counters 70 and 71 is effected in FIG. 2C by the gating circuitry in which signals are applied to gates 78 through 83. Thus, whenever the appropriate controller bits are in any state other than "1" during a "read sign" or "write sign" operation, the counters 70 and 71 will be inhibited from increasing the address value stored in register 12.

FIG. 3 depicts in tabular form several illustrative operations of the embodiment depicted in FIGS. 2A, 2B, and 2C. The table of FIG. 3 illustrates seven examples. In each example a field of three "1's" is added to a field of three "2's" by execution of an "add" command. Each example indicates the contents of an instruction and the contents of memory at addresses specified by the instruction. Thus, in Example 1, the A controller bits (state 2) indicate that the data field associated with the A address is in "alphanumeric" format, the B controller bits (state 0) indicate that the data field associated with the B address is in "unsigned numeric" format, and the C controller bits (state 0) indicate that the sum of the two previous fields should be stored in "unsigned numeric" format. The A address is 01002 and the values stored in addresses 01002 through 01007 are 515151, respectively. This field therefore represents the decimal number 111 in "alphanumeric" format. The B address set forth in the instruction is 01009 and at addresses 01009 through 01011 the decimal digits 222 are stored. Thus, these addresses store the number 222 in "unsigned numeric" format. The C address set forth in the instruction is 01015 and at addresses 01015 through 01017 of the memory the digits 333 are stored. The number 333 represents the sum of the first two data fields with the sum being stored in "unsigned numeric" format.

In Example 2, the same numbers are added to get the same result with the numbers 111 in this case being stored in "unsigned numeric" format, the numbers 222 being stored in "alphanumeric" format, and the sum 333 being stored in "unsigned numeric" format.

In Example 3, the two numbers being added are both in "unsigned numeric" format and their sum is stored in "alphanumeric" format.

In Example 4, all three numbers are stored in "alphanumeric" format.

In Examples 5 and 6, the two numbers being added are stored in "signed numeric" format and their sum is stored in "unsigned numeric" format. In Example 5, however, the two numbers being added are both positive whereas in Example 6 the two numbers being added are both negative. The positive and negative arithmetic signs may be specified in the four digits stored at an address by making use of otherwise unused combinations of bits. Thus, for example, the "plus" sign may be indicated by the eight-bit and four-bit locations of the digit both storing binary "1's" with the two-bit and one-bit locations storing binary "0's." Similarly, the "minus" sign may be indicated by the eight-bit, four-bit, and one-bit locations of the digit, storing binary "1's" and the two-bit storing a binary "0."

In Example 7, the first two numbers are again in "signed numeric" format while their sum is in "unsigned numeric" format. In this example, however, the first number 111 is positive and the second number 222 is negative, making the sum of the two 111 rather than 333, as in the previous six examples.

What has been described is considered to be only one illustrative embodiment of the invention. Accordingly, it is to be understood that various and numerous other arrangements may be devised by one skilled in the art without departing from the spirit and scope of the present invention.

What is claimed is:

1. A data processing system comprising:

memory means for storing a plurality of individually addressable binary coded words including a plurality of data words and a plurality of instruction words;

processor means for performing manipulations upon the data words stored in the memory;

each instruction word including bits manifesting a particular operation performable by the processor and bits manifesting an address field, the address field bits comprising address bits manifesting a particular data word address and controller bits manifesting one of several data formats; and means for transferring data words between the memory means and the processor means comprising translation means, controlled by the controller bits associated with the words being transferred, for effecting translations of each word between the format manifested by its controller bits and a predetermined processor format.

2. A data processing system comprising:

memory means for storing a plurality of individually addressable binary coded words including a plurality of instruction words and a plurality of data words, the data words being stored in accordance with several different binary codes;

each instruction word including bits manifesting a particular operation and bits manifesting an address field, the address field bits comprising bits manifesting a particular data word address and controller bits manifesting the binary code of the data word stored at that address; and means controlled by the controller bits associated with the address field of a predetermined instruction word and utilizing the data word associated with that address field for performing the operation manifested by the operation bits of the predetermined instruction.

3. A data processing system comprising:

memory means for storing a plurality of individually addressable binary coded words including a plurality of instruction words and a plurality of data words, the data words being stored in accordance with several different binary codes;

processor means for performing manipulations upon the data words stored in the memory;

each instruction word including bits manifesting a particular operation performable by the processor and bits manifesting an address field, the address field bits comprising address bits manifesting a particular data word address and controller bits manifesting the binary code of the data word stored at that address; and means for reading predetermined ones of the data words from the memory means and for transferring them to the processor comprising:
means utilizing the controller bits associated with each of the predetermined data words for determining the binary code in which each of the predetermined data words is stored;
means responsive to the determination of the binary code of each of the predetermined data words for translating to a particular binary code those ones of the predetermined data words not in the particular binary code; and
means for transferring all of the predetermined data words to the processor in the particular binary code.

4. A data processing system comprising:
memory means for storing a plurality of individually addressable binary coded words including a plurality of instruction words and a plurality of data words, the data words being storable in accordance with several different binary codes;
each instruction word including bits manifesting an address field comprising address bits manifesting a particular data word address and controller bits manifesting the binary code of the data word storable at that address; and
means for writing data words received from a processor in a particular binary code into predetermined data word addresses of the memory comprising:
means utilizing the controller bits associated with the predetermined addresses for determining the binary codes of data words storable at the predetermined addresses;
means responsive to the determination that a data word is to be stored in a predetermined address in a binary code other than the particular binary code for translating the word to the code associated with the predetermined address; and
means for transferring the data words received from the processor to the memory in the binary codes specified by the controller bits associated with respective ones of the predetermined addresses.

5. A data processing system comprising:
memory means for storing a plurality of individually addressable binary coded words including a plurality of instruction words and a plurality of data words, the data words being stored in accordance with several different binary codes;
each instruction word including bits manifesting a particular operation and bits manifesting an address field, the address field bits comprising address bits manifesting a particular address in memory and controller bits;
one combination of controller bit values indicating that an indirect address is stored at the address manifested by the associated address bits;
other combinations of controller bit values indicating the binary code of a data word stored at the address manifested by the associated address bits;
processor means for performing predetermined manipulations upon the data word stored in the memory;
means for determining the controller bit values associated with predetermined address fields;
means responsive to the determination of the binary code of predetermined ones of the data words for translating to a particular binary code those ones of the predetermined data words not in the particular binary code; and
means for transferring all of the predetermined data words to the processor in the particular binary code.

6. A data processing system comprising:
memory means for storing a plurality of individually addressable binary coded words including a plurality of instruction words and a plurality of data fields, each data field comprising a plurality of operands, the data fields being represented in accordance with several different binary codes;
in accordance with a first binary code, the data fields comprise operands each of which is represented by an $m$-digit;
in accordance with a second binary code, the data fields comprise operands each of which is represented by an $n$-bit character;
processor means for performing manipulations upon data fields represented in accordance with the second code;
each instruction word including bits manifesting a particular operation performable by the processor and bits manifesting an address field, the address field bits comprising address bits manifesting the address of the first operand of a data field and controller bits manifesting the binary code of the data field; and
means for transferring data fields between the memory means and the processor means comprising translation means, controlled by the controller bits associated with the field being transferred, for effecting translations between the second code and the code manifested by the controller bits of the field being transferred.

7. A data processing system comprising:
memory means for storing a plurality of binary coded words including a plurality of instruction words and a plurality of data fields, each data field comprising a plurality of individually addressable operands, the data fields being represented in accordance with several different binary codes;
in accordance with a first binary code, the data fields comprise operands each of which is represented by an $m$-bit digit;
in accordance with a second binary code, the data fields comprise operands each of which is represented by an $n$-bit character;
processor means for performing manipulations upon data fields represented in accordance with the second code;
first and second $m$-bit memory information registers associated with the memory means;
first and second processor information registers associated with the processor means, the first register having an $(n-m)$-bit capacity and the second register having an $m$-bit capacity;
each instruction word including bits manifesting a particular operation performable by the processor and bits manifesting an address field, the address field bits comprising address bits manifesting the address of the first operand of a data field and controller bits manifesting the binary code of the data field; and
means for reading predetermined ones of the data fields from the memory means and for transferring them to the processor comprising:
means utilizing the controller bits associated with each of the predetermined data fields for determining the binary code in which each of the predetermined data fields is represented;
means responsive to a determination that a data field is represented in accordance with the first code for transferring each of the digits of this field to one of the first and second memory information registers in accordance with a predetermined pattern;
means for sequentially transferring the digits of the data field from the one of the first and second memory information registers in which they are stored to the second processor information register; and
means for inserting a predetermined binary value into the first processor information register substantially simultaneously with the transfer of each digit from one of the memory information registers to the second processor information register.

8. A data processing system according to claim 7 in which the means for transferring digits of the data field to the first and second memory information registers transfers digits stored at even valued addresses to the first memory information register and digits stored at odd valued addresses to the second memory information register.

9. A data processing system according to claim 8 in which the transferring means simultaneously transfers a digit stored at an even valued address to the first memory information register and a digit stored at an odd valued address to the second memory information register.

10. A data processing system according to claim 9 in which $n=2m$.

11. A data processing system according to claim 10 in which the means for reading predetermined ones of the data fields further comprises:

means responsive to a determination that a data field is represented in accordance with the second code for sequentially transferring each of the characters of this field to the first and second memory information registers; and means for sequentially transferring the characters of the data field stored in the first and second memory information registers to the first and second processor information registers.

12. A data processing system comprising:

memory means for storing a plurality of binary coded words including a plurality of instruction words and a plurality of data fields, each storable data field comprising a plurality of individually addressable operands, the data fields being represented in accordance with several different binary codes;

in accordance with a first binary code, the data fields comprise operands each of which is represented by an $m$-bit digit;

in accordance with a second binary code, the data fields comprise operands each of which is represented by an $n$-bit character;

processor means for performing manipulations upon data fields represented in accordance with the second code;

first and second $m$-bit memory information registers associated with the memory means;

first and second processor information registers associated with the processor means, the first register having an $(n-m)$-bit capacity and the second register having an $m$-bit capacity;

each instruction word including bits manifesting a particular operation performable by the processor and bits manifesting an address field, the address field bits manifesting the address of the first operand of a data field and controller bits manifesting the binary code of the data field; and means for receiving data fields represented in the second code from the processor information registers and for writing them in addresses associated with predetermined address fields comprising:

means utilizing the controller bits associated with each of the predetermined address fields for determining the binary code in which each of the received data fields is to be written;

the characters of the received data fields being sequentially stored in the first and second processor information registers; and means responsive to a determination that a data field is to be written in accordance with the first code for sequentially transferring the contents of the second processor information register to one of the first and second memory information registers in accordance with a predetermined pattern.

13. A data processing system according to claim 12 in which the means for transferring the contents of the second processor information register to one of the first and second memory information registers transfers the contents to the first memory information register when a digit is to be written into an even valued address and transfers the contents to the second memory information register when a digit is to be written into an odd valued address.

14. A data processing system according to claim 13 in which the means for receiving data fields represented in the second code from the processor information registers and for writing them in addresses associated with predetermined address fields further comprises:

means responsive to a determination that a data field is to be written in accordance with the second code for sequentially transferring the contents of the first and second processor information registers to the first and second memory information registers, respectfully.

15. A data processing system comprising:

memory means for storing a plurality of binary coded words including a plurality of instruction words and a plurality of data fields, each data field comprising a plurality of individually addressable operands, the data fields being represented in accordance with several different binary codes;

in accordance with a first binary code, the data fields comprise operands each of which is represented by an $m$-bit digit, the first operand of each field representing an arithmetic sign;

in accordance with a second binary code, the data fields comprise operands each of which is represented by an $m$-bit digit, the first operand of each field representing a numeric value;

in accordance with a third binary code, the data fields comprise operands each of which is represented by a $2m$-bit character, the first operand of each field representing an alphanumeric character;

processor means for performing manipulations upon data fields represented in a fourth binary code, each operand of which is represented by a $2m$-bit character, the first operand of each field representing an arithmetic sign;

first and second $m$-bit memory information registers associated with the memory means;

first and second $m$-bit processor information registers associated with the processor means;

each instruction word including bits manifesting a particular operation performable by the processor and bits manifesting an address field, the address field bits comprising address bits manifesting the address of the first operand of a data field and controller bits manifesting the binary code of the data field; and means for reading predetermined ones of the data fields from the memory means and for transferring them to the processor comprising:

means utilizing the controller bits associated with each of the predetermined data fields for determining the binary code in which each of the predetermined data fields is represented;

means responsive to a determination that a data field is represented in accordance with one of the first and second codes for transferring each of the digits of this field to one of the first and second memory information registers in accordance with a predetermined pattern and means for sequentially transferring the digits from the one of the first and second memory information registers in which they are stored to the second processor information register;

means responsive to a determination that a data field is represented in accordance with the third code for sequentially transferring each of the characters of this field to the first and second memory information registers and means for sequentially transferring the characters stored in the first and second memory information registers to the first and second processor information registers; and means responsive to a determination that a data field is represented in accordance with the one of the second and third codes for inserting in the processor information register bits representing, in accordance with the fourth code, a particular arithmetic sign in advance of the transference to the processor information register of the first operand of the data field.

16. A data processing system comprising:

memory means for storing a plurality of binary coded words including a plurality of instruction words and a plurality of data fields, each data field comprising a plurality of individually addressable operands, the data fields being represented in accordance with several different binary codes;

in accordance with a first binary code, the data fields comprise operands each of which is represented by an $m$-bit digit, the first operand of each field representing an arithmetic sign;

in accordance with a second binary code, the data fields comprise operands each of which is represented by an $m$-bit digit, the first operand of each field representing a numeric value;

in accordance with a third binary code, the data fields comprise operands each of which is represented by a $2m$-bit character, the first operand of each field representing an alphanumeric character;

processor means for performing manipulation upon data fields represented in a fourth binary code, each operand of which is represented by a $2m$-bit character, the first operand of each field representing an arithmetic sign;

first and second $m$-bit memory information registers associated with the memory means;

first and second $m$-bit processor information registers associated with the processor means;

each instruction word including bits manifesting a particular operation performable by the processor and bits manifesting an address field, the address field bits comprising address bits manifesting the address of the first operand of a data field and controller bits manifesting the binary code of the data field; and means for receiving data fields represented in the fourth code from the processor information registers and for writing them in addresses associated with predetermined address fields comprising:

means utilizing the controller bits associated with each of the predetermined address fields for determining the binary code in which each of the received data fields is to be written;

the operands of the received data fields being sequentially stored in the first and second processor information registers;

means responsive to a determination that a data field is to be written in accordance with the first code for sequentially transferring the contents of the second processor information register to one of the first and second memory information registers in accordance with a predetermined pattern;

means responsive to a determination that a data field is to be written in accordance with the second code for inhibiting transference of the first operand of the received data field and for subsequently sequentially transferring the contents of the second processor information register to one of the first and second memory information registers in accordance with the predetermined pattern; and means responsive to a determination that a data field is to be written in accordance with the third code for inhibiting transference of the first operand of the received data field and for subsequently sequentially transferring the contents of the first and second processor information registers to the first and second memory information registers, respectively.

References Cited

UNITED STATES PATENTS

| | | | |
|---|---|---|---|
| 3,012,230 | 12/1961 | Galas et al. | 340—172.5 |
| 3,292,158 | 12/1966 | Schneberger | 340—172.5 |
| 3,310,786 | 3/1967 | Rinaldi et al. | 340—172.5 |
| 3,356,996 | 12/1967 | Niquette et al. | 340—172.5 |

ROBERT C. BAILEY, *Primary Examiner.*

R. B. ZACHE, *Assistant Examiner.*